INVENTOR.
Andrew Herczog 3,340,074
BARIUM TITANATE MATERIALS
Andrew Herczog, Painted Post, N.Y., assignor to Corning Glass Works, Corning, N.Y., a corporation of New York
Filed Mar. 16, 1964, Ser. No. 352,138
7 Claims. (Cl. 106—39)

ABSTRACT OF THE DISCLOSURE

This invention relates to crystalline barium titanate materials having zinc and fluorine ions incorporated into the crystal structure of the barium titanate to improve the electrical characteristics thereof. It further relates to a method for preparing such materials which are particularly useful in the manufacture of capacitors.

---

$BaTiO_3$ either in single crystal form or in polycrystalline ceramic form, is well known as a ferroelectric material. The many practical applications of $BaTiO_3$ include, for example, electrical condensers, dielectric amplifiers, memory elements, positive temperature coefficient resistors and non-linear circuit elements such as voltage variable resistors, capacitors and diodes. In such applications, the significant properties include ferroelectric transition temperature, dielectric constant, dielectric losses, electrical resistivity, dielectric breakdown strength, change of dielectric constant with variations of temperature especially near room temperature, and ferroelectric hysteresis characteristics.

It is an object of this invention to improve the electrical characteristics of $BaTiO_3$ ceramics and of single crystals.

A specific objective is to improve the electrical characteristics of ceramic $BaTiO_3$ for capacitor applications. Among the advantages obtained by the present invention for such applications are: improvement of the temperature characteristics of the dielectric constant by reduction of the peak occurring at the ferroelectric transition temperature of about 120° C., reduction of dielectric losses, increase of the electric resistivity and of the stability of the material at elevated temperature under electric field.

Another specific objective is to modify the characteristics of $BaTiO_3$ single crystals to suit some of the other applications mentioned above. The advantages obtained by the present invention include control of the ferroelectric transition temperature of single crystals, between −10° and +120°, according to need, thereby controlling the value of the dielectric constant and of the spontaneous polarization at room temperature, control of the rate of change of the dielectric constant with temperature and increase of the electrical resistivity of the material to much higher values than obtainable by known methods. By proper choice of the ferroelectric transition temperature it is also possible to obtain hysteresis loops with better symmetry, larger remanent polarization and smaller coercive force.

The foregoing and other objects are obtained in $BaTiO_3$, according to the present invention, by concurrently incorporating zinc and fluorine ions in the crystal structure of $BaTiO_3$. I have found on the basis of experimental data and of theoretical analysis that these ions are substituted, in principle, according to the stoichiometric formula $Ba(Ti_{1-x}Zn_x)O_{3-2x}F_{2x}$ where $x$ is preferably between about 0.001 and 0.020.

The improvements achieved in the modified single crystal and ceramic materials of the present invention may be better understood with reference to the accompanying drawings, wherein.

The addition of Zn and F ions to polycrystalline $BaTiO_3$ ceramic materials may be made by firing in an oxidizing atmosphere a mixture of $BaTiO_3$ and suitable compounds of Zn and F such as ZnO, $ZnCO_3$, $BaF_2$, $CaF_2$, $ZnF_2$, $SnF_2$ or $MgF_2$. Alternatively, the ions of Zn and F may be added during the formation of $BaTiO_3$. In this manner, a modified $BaTiO_3$ ceramic material, may be formed by mixing $BaTiO_3$-forming compounds such as $BaCO_3$ and $TiO_2$ with suitable compounds of Zn and F such as ZnO and $BaF_2$, compressing and sintering in an oxidizing atmosphere.

Figure 1:
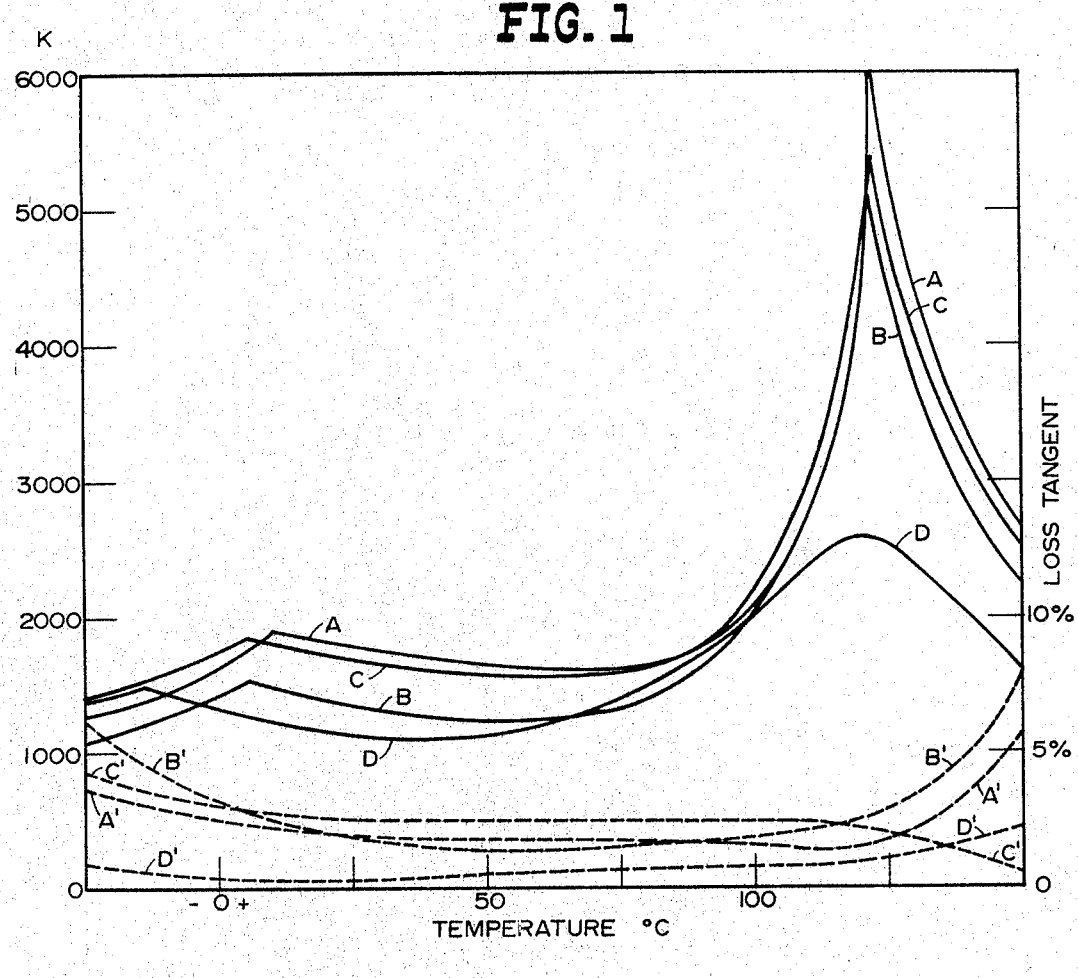
FIG. 1 is a graph showing the dielectric constant (K) and loss tangent (L.T.) of various polycrystalline ceramic $BaTiO_3$ materials over a temperature range of −25° C. to 150° C. The curves correspond to the compositions shown in Table I, below.

I have found that the addition of both zinc and fluorine ions is necessary to obtain the desired improvement in the electrical characteristics of barium titanate in accordance with the present invention. This is illustrated in FIG. 1, described with reference to Table I, below, with compositions A, B, C, D, corresponding to the curves similarly identified in FIGURE 1.

TABLE I

| Batch Composition (gm. mole) | Compositions of B $TiO_3$ | | | |
|---|---|---|---|---|
| | A | B | C | D |
| BaO | 1 | 0.95 | 0.95 | 0.90 |
| $BaF_2$ | | | 0.05 | 0.05 |
| $TiO_2$ | 1 | 0.95 | 1.0 | 0.95 |
| ZnO | | 0.10 | | 0.10 |
| Mole fractions of F found after firing | 0 | 0 | <0.001 | 0.005 |

It will be noted that a sharp increase in dielectric constant occurs at about 120° C. (FIGURE 1) for the sample containing no additive (sample A) as well as for samples containing zinc only (sample B) or fluorine only (sample C). However, in the sample containing both zinc and fluorine (sample D), the sharp increase in dielectric constant at about 120° C. has been flattened considerably. Similarly, the loss tangent is lower for sample D than for the other samples. These improvements are therefore a function at the zinc and fluorine ions incorporated into the lattice structure of $BaTiO_3$.

Example 1, below, describes the method of preparation of composition D. The other compositions (A, B, and C) were prepared in a similar manner, however, altering the constituents to provide the compositions shown in Table I.

EXAMPLE I 178 parts by weight of $BaCO_3$ were mixed with 76 parts by weight of $TiO_2$ and 8 parts by weight ZnO and 9 parts by weight $BaF_2$. The mixture was pelletized and fired at 1200° C. in air for 6 hours. The fired pellets were then ground, pelletized and fired at 1300° C. in air for 6 hours to yield dense pellets of $BaTiO_3$ doped with Zn and F ions. An electrically heated furnace was used to preference to a gas fired furnace in order to minimize the amount of moisture present during firing. This was done to avoid excessive volatilization of fluorine which occurs when excessive moisture is present during the firing step.

The dielectric constant and loss tangent of the resulting ceramic material was measured at various temperatures between −25° C. and 150° C. The data is plotted as curves D and D′ in FIG. 1.

In order to reduce fluorine volatilization, the rate of reaction should be as high as possible. For this purpose, the use of homogeneous mixtures of batch materials, consisting of very fine particles, and sintering at lower temperatures in oxidizing atmosphere, free of water vapor, is beneficial. The use of very well mixed or coprecipitated batch materials and sintering by hot pressing is particularly desirable.

Of the fluorides used in the batch preparation according to Example 7, only a small fraction of the fluorine ions is incorporated in the lattice. The quantity of fluorine found after firing, as reported in Table I, Column D, represents the fluorine stabilized in the lattice. The remainder of the fluorine is volatilized by hydrolysis, and the $BaF_2$ from which the fluorine is volatilized is converted into BaO, a normal batch constituent, for the formation of $BaTiO_3$. Substantial amounts of $BaF_2$ can be used in substitution for $BaCO_3$ without ill effects if reaction conditions are such as to cause hydrolysis of the excess fluoride. A fluorine bearing gas may be introduced in the furnace atmosphere in order to suppress volatilization of fluorine from the batch. In such case the amount of fluoride added to the batch may be somewhat reduced.

From the zinc compound used in the batch, a quantity of zinc in about 1:2 mol ratio of Zn to stabilized fluorine is incorporated in the $BaTiO_3$ lattice. The excess Zn will form a second phase, such as $Zn_2TiO_4$, which is not desirable in larger amounts, since it does not have the advantageous electrical properties of the modified $BaTiO_3$. For this reason, it is preferred that the amount of zinc compound in the batch does not exceed about 0.1 gr. mole per gr. mole $BaTiO_3$ and it should be used in the batch preparation in substitution for both barium and titanium. Under conditions where fluorine volatilization is less, a more complete incorporation of fluorine in the lattice is obtainable, the amount of zinc needed in the batch is lower since the fraction of Zn atoms incorporated in the lattice is greater.

Generally, the addition of zinc to $BaTiO_3$ will increase the solubility of fluorine in the lattice. However, zinc cannot be introduced into the lattice without the presence of fluorine. Fluorine, on the other hand, can be introduced into the $BaTiO_3$ lattice without zinc addition, but it has no effect on the ferroelectric transition temperature. Because of the possibility of introducing fluorine by other means, such as by the presence of fluorine-bearing gases in the furnace atmosphere, in which case the addition of zinc would only further enhance the uptake of fluorine, it is not possible to establish an upper limit for the fluorine. The lower limit of the number of fluorine atoms can be established as at least twice the number of atoms of zinc present in the $BaTiO_3$ lattice.

The electrical characteristics of single crystals of barium titanate may also be modified in incorporating zinc and fluorine into the lattice structure of the crystal. Single crystals may be prepared by partially dissolving barium titanate powder and a source of zinc ions such as zinc oxide, zinc fluoride, or zinc carbonate in a potassium fluoride flux at temperatures of about 1100° to 1250° C., and then crystallizing from the flux at a slow rate of cooling.

Figure 2:
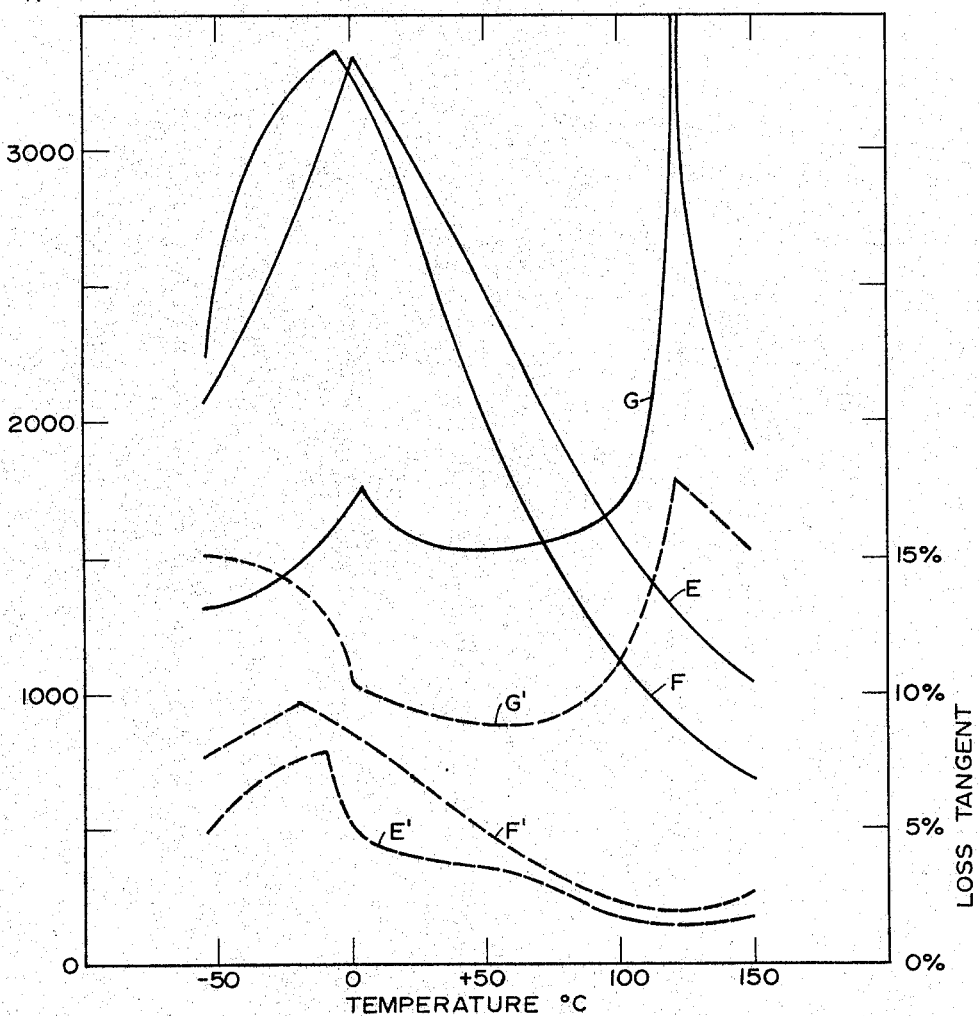
FIG. 2 is a graph showing the dielectric constant (K) and loss tangent (L.T.) of single crystals of modified $BaTiO_3$ of the present invention (curves E, E′, F and F′) compared with a single crystal of unmodified $BaTiO_3$ (curves G and G′) over a temperature range of −50° C. to 150° C.

The electrical characteristics of single crystals grown in this manner are shown in FIGURE 2. In the figure, curves E and F show the variation of dielectric constant (K) as a function of temperature for single crystals grown in accordance with the procedure described in Example 2, below. The variation of loss tangents (L.T.) as a function of temperature of the same crystals is shown by curves E′ and F′. Curves G and G′, show similar functions for a barium titanate crystal grown from a potassium fluoride flux with no zinc ions present. It will be noted from FIG. 2 that a higher dielectric constant at room temperature is obtained in the crystals grown in accordance with Example 2.

EXAMPLE 2

A mixture of 15 grams of C.P. grade $BaTiO_3$ powder, 0.25 gram of ZnO and 0.25 gram of $BaF_2$, all in powder form and intimately mixed, were placed in a platinum crucible with 33.5 g. potassium fluoride, added to form a top layer. The crucible was covered with a platinum cover sheet, and heated for 6 hours at 1150° C., then cooled at a rate of 20° C./hr. to 900° C. at which time the remaining flux was poured off. The crucible was then placed back in the furnace and allowed to cool gradually to room temperature. In the crucible single crystal platelets with a "butterfly twin" growth habit were found. The crystals were cubic at room temperature exhibiting a perovskite type structure and were characterized electrically by dielectric constants and loss tangents shown as a function of temperature in FIG. 2 (curves E, E′, F and F′).

In this method an ample source of fluorine ions is provided by the potassium fluoride flux, and the volatilization of fluorine, found to be a limiting factor for ceramic preparations, is of no concern. Single crystal specimens were pulverized and leached with dilute hydrochloric acid to eliminate flux inclusions and other impurities not incorporated in the crystal structure. The material was then chemically analyzed and found to contain 0.013 gr. atom of zinc and 0.056 gr. atoms of fluorine per gr. mole $BaTiO_3$. Crystals grown without zinc addition, whose characteristics are also shown in FIG. 3 (Curves G and G′), contain about 0.03 gr. atoms fluorine substituting for missing oxygen ions in lattice. The difference in fluorine content between the two cases is 0.026 gr. atoms, that is twice the number of zinc atoms found in the lattice. On this basis, the stoichiometry of the crystal growth, disregarding the fluorine addition which occurs without the presence of zinc, is $BaTi_{.987}Zn_{.013}O_{2.974}F_{.026}$, or in a more general form $BaTi_{1-x}Zn_xO_{3-2x}F_{2x}$. It will be seen that this formula satisfies the rule of electrostatic neutrality of the lattice.

The amount of zinc and fluorine found to be incorporated into the lattice, according to the example above, does not necessarily represent the limit of solid solubility of the system. Larger amounts may be substituted by adding more ZnO to the batch. However, the control of the ferroelectric transition temperature between about room temperature and 120° C. is of primary interest. If the lattice contains more than .013 gram atoms of Zn per gram mole of $BaTiO_3$, the ferroelectric transition temperature is shifted farther below room temperature, where the properties are of less practical interest.

The assumption that zinc atoms are substituted in titanium positions is based on several facts and considerations. The main evidence is that zinc containing crystals are P-type conductors while crystals without zinc are N-type. Acceptor states responsible for conductivity inversion are only possible if the bivalent zinc ion takes the place of a higher valency cation which can be titanium, but not barium. Furthermore, the replacement of a $Ti^{+4}$ ion (ionic radius 0.68 A.) with an ion of Zn (radius 0.74 A.) would cause an expansion of the lattice from tetragonal to cubic as is the case in the crystals of the present invention. On the other hand, zinc in replacement of barium ion could only lead to structures different from the present perovskite lattice, such as the spinel structure, because of misfit of ionic radii.

The crystal containing 0.013 gr. atoms of zinc transforms, on heating, to the cubic structure at about 0° C. Crystals containing smaller amounts of zinc have transition temperatures between 0° C. and 120° C., and have therefore different ferroelectric properties and different temperature characteristics of dielectric constant at around room temperature. At a zinc level of 0.001 gr. atom per gm. mole of $BaTiO_3$ the transition temperature is near 120° C. By increase of the zinc content from 0.001 to 0.01 (atoms per mole $BaTiO_3$) the ferroelectric transition temperature and the peak of the dielectric constant will progressively shift from 120° C. to room temperature and below. Such additions are also advantageous for increasing the resistivity of the crystal, decreasing the loss tangents and for obtaining more stable and improved hysteresis characteristics. Crystals can also be grown with higher zinc content, up to at least 0.02 gr. atoms per gr. mol $BaTiO_3$. As mentioned previously, these crystals are of P-type conductivity. P-type crystals have higher resistivity and lower loss tangents than N-type crystals grown without zinc addition because the mobility of P-type charge carriers is lower. A substantial increase of resistivity is also obtained, for this reason, in zinc and fluorine containing ceramic materials. Higher resistivity is associated with higher breakdown strength, and better stability of electrical characteristics in general, under exposure to electrical load or to elevated temperatures.

Various methods can be used for controlling the zinc content of $BaTiO_3$ crystals grown from fluoride fluxes, such as the use of different amounts of a zinc compound added to the $BaTiO_3$ powder, the use of different ratios between $BaTiO_3$ and flux and different growth temperatures. The use of $BaF_2$ shown in Example 2 is beneficial but it is not a necessary condition. Non-fluoride fluxes may also be used, provided that fluorides are present in an amount at least twice the quantity of zinc to be introduced into the crystal.

It will be evident to one skilled in the art that variations and modifications can be practical within the scope of the invention, as described above and defined in the appended claims.

I claim:
1. A crystalline barium titanate material, consisting essentially of barium titanate having zinc ions incorporated in the lattice structure thereof in an amount between about 0.001 and 0.02 gram atoms of zinc per gram mole of barium titanate and having fluorine ions incorporated in the lattice structure thereof, in an atomic ratio, with respect to zinc, of at least 2:1.
2. A crystalline barium titanate material according to claim 1 wherein zinc is present in the lattice structure in an amount of between about 0.001 and 0.013 gram atoms of zinc per gram mole of barium titanate.
3. A polycrystalline ceramic dielectric material consisting essentially of barium titanate, containing, incorporated in the lattice structure thereof, 0.001 to 0.02 gram atoms of zinc per mole of barium titanate, and fluorine atoms in an atomic ratio, with respect to zinc, of at least 2:1.
4. A polycrystalline ceramic composition according to claim 3 wherein zinc is present in the lattice structure in an amount of between 0.001 and 0.013 gram atoms of zinc per gram mole of barium titanate.
5. A single crystal consisting essentially of barium titanate, containing, incorporated within the lattice structure, 0.001 to 0.020 gram atoms of zinc per gram mole of barium titanate and fluorine atoms in an atomic ratio, with respect to zinc, of at least 2:1.
6. A single crystal according to claim 5 wherein zinc is present in the lattice structure in an amount of between 0.001 and 0.013 gram atoms of zinc per gram mole of barium titanate.
7. A method of preparing single crystals consisting essentially of barium titanate, modified by the presence in the lattice structure, of zinc and fluorine atoms, in a ratio of at least two fluorine atoms for each zinc atom, said method comprising mixing barium titanate, zinc oxide and a potassium fluoride flux, heating the mixture to a temperature of between about 1100° C. to 1250° C., for a period of time sufficient to melt the flux and dissolve at least a portion of the barium titanate and zinc oxide therein, and gradually cooling the melt to cause modified single crystals of barium titanate to precipitate therefrom.

References Cited

UNITED STATES PATENTS

| 2,377,910 | 6/1945 | Wainer et al. | 106—39 |
| 2,515,790 | 7/1950 | Navias | 106—39 |
| 2,852,400 | 9/1958 | Remeika | 106—39 |

FOREIGN PATENTS 689,382  3/1953  Great Britain.

OTHER REFERENCES

Baxter et al.—"Effect of Additives of Limited Solid Solubility on Ferroelectric Properties of Barium Titanate Ceramics," J. Amer. Ceramic Soc., volume 42 (1959), pages 465–470.

HELEN M. McCARTHY, *Primary Examiner.*